UNITED STATES PATENT OFFICE.

JAMES E. THOMPSON, OF MAYVILLE, WISCONSIN.

PROCESS OF PURIFYING CRUDE HYDROCARBONS.

1,276,284.     Specification of Letters Patent.     Patented Aug. 20, 1918.

No Drawing.     Application filed July 25, 1917. Serial No. 182,721.

*To all whom it may concern:*

Be it known that JAMES E. THOMPSON, a citizen of the United States, residing at Mayville, in the county of Dodge and State of Wisconsin, has invented certain new and useful Improvements in Processes of Purifying Crude Hydrocarbons, of which the following is a specification.

This invention relates to processes of purifying crude semi-refined hydrocarbons, and particularly to a process of this character which has for its end, the removal of matter which renders these crude hydrocarbons unfit for commercial use.

Specifically, the object of this invention is to provide a process for treating one of the waste products of coke ovens, namely, the product known as "$CS_2$ benzol" (that is to say benzol rich in various sulfureted carbon compounds), whereby to purify this product for use in the commercial arts.

A further object is to provide means for recovering from the waste product so treated, sulfo-cyanid of ammonia, sulfids, etc.

A further object is to provide for deodorizing the purified material by the process above referred to.

Other objects will appear in the course of the following description.

One of the waste products in the production of coke is a hydrocarbon, known as "$CS_2$ benzol." This product is at the present time of no commercial value, because of the inclusion therein of a large amount of impurities. These impurities consist chiefly of carbon bisulfid, sulfureted hydrogen, and sulfo-cyanid compounds.

My improved process consists in adding to the light oil, that is, such a hydrocarbon as "$CS_2$ benzol," an aqueous solution of ammonia of such strength that the specific gravity on the solution is as low or lower than that of the light oil which is being treated. Because the specific gravities of the two liquids are approximately the same, or because the ammonia solution is less in specific gravity than the light oil, the two solutions will mix without agitation and the ammonia will chemically combine with the impurities and this chemical combination, which is expressed by the equation $$NH_3 + HCNS = NH_4CNS,$$

increases the specific gravity of the combination of the ammonia and the impurities, and the ammonia solution will settle to the bottom of the containing vessel, together with all water and waste. This water, waste, and the ammonia solution can then be drawn off. The light oil, which is now above the ammonia solution, is thus free from objectionable matter and can be used in the arts. It is not only free from the objection of the impurities, but the light oil is deodorized.

It will be seen that by using an ammonia solution of correct strength, the ammonia will thoroughly mix with light oil and thus does away with the necessity of agitating or churning the light oil and the ammonia, and further it will be seen that redistillation is not necessary in order to separate the light oil from the combined ammonia and impurities.

It is furthermore to be noted that at the same time that the light oil is relieved of its impurities, such by-products as sulfo-cyanid of ammonia and other sulfids may be recovered.

While this process is particularly adapted for the removal of impurities from "$CS_2$ benzol," yet I do not wish to be limited to purifying only this material, as other hydrocarbons containing the benzene ring may also be purified by this process.

The chemical reactions between the solution of ammonia and the impurities in the "$CS_2$ benzol" are somewhat complicated and obscure. The impurities probably exist as compounds of the benzene series, but may contain the methane and ethane. The material treated "$CS_2$ benzol" is also known as "first runnings" that is, when the light oils are distilled, the first part of the distillate is rejected and contains a great deal of the volatile compounds of sulfur.

One of the reactions is stated above. Other reactions between the impurities in the "$CS_2$ benzol" and the ammonia solution are as follows:—

(1) Hydrogen sulfid ($H_2S$) + ammonia ($2NH_3$) = ammonium sulfid ($NH_4$)$_2S$.

(2) Ammonia ($NH_3$) + hydrocyanic acid (HCN) = ammonium cyanid ($NH_4$ CN).

One of the most important reactions is:—

(3) Phenyl mercaptan ($C_6H_5HS$) + ammonia in solution ($NH_3 + H_2O$) = phenol ($C_6H_5OH$) + ammonium sulfid ($NH_4$)$_2S$.

As to the strength of the solution of ammonia, this should be 25% or higher. As the compounds are formed and some ammonia escapes, the aqueous solution settles to the bottom of the tank, as it is then slightly heavier than the light oil. The solution which settles to the bottom of the tank contains sulfocyanid of ammonium, cyanid of ammonium, etc. Ten pounds of a 26% solution of ammonia is enough to treat 50 gallons of the light oil but it will be understood that these amounts are not exact as there is a slight loss of ammonia. It is to be remembered, of course, that the chemistry of the benzene series has not been entirely worked out and that the impurities in the light oils may vary greatly but the equations before given are approximately correct as far as they go.

Having described my invention, what I claim is:—

1. The process of purifying hydrocarbons containing the benzene ring which consists in mixing therewith an ammoniacal aqueous solution having approximately the same specific gravity as the hydrocarbon.

2. The process of purifying hydrocarbons containing the benzene ring consisting in mixing therewith an ammoniacal aqueous solution having a specific gravity not greater than the specific gravity of the hydrocarbon.

3. The process of purifying hydrocarbons containing the benzene ring consisting in mixing therewith an ammoniacal aqueous solution having a specific gravity not greater than the specific gravity of the hydrocarbon, allowing the impurities which combine with the ammoniacal solution to sink and drawing off the purified hydrocarbon.

4. The process of purifying liquid "$CS_2$ benzol" which consists in mixing therewith an aqueous solution of ammonia, allowing the ammonia combined with the impurities to sink and then withdrawing the purified "benzol."

5. The method of purifying hydrocarbons containing the benzene ring consisting in mixing with the hydrocarbon an aqueous solution having a specific gravity not greater than the specific gravity of the hydrocarbon which aqueous solution will chemically combine with the impurities in the hydrocarbon and increase the specific gravity of the solution so formed and then drawing off the superimposed relatively lighter purified hydrocarbon.

6. The process of purifying "$CS_2$ benzol" consisting in treating said product with an aqueous solution of ammonia having a specific gravity not greater than the specific gravity of the benzol, allowing said solution, to combine with the impurities in the "benzol," then allowing it to sink and then withdrawing the superjacent purified "benzol."

In testimony whereof I hereunto affix my signature in the presence of two witnesses.

JAMES E. THOMPSON.

Witnesses:
LLOYD H. ACKERMAN,
L. E. MUELLER.